(12) United States Patent
Zhou

(10) Patent No.: US 11,877,365 B2
(45) Date of Patent: Jan. 16, 2024

(54) LED BACKLIGHT DRIVING CIRCUIT, BACKLIGHT MODULE AND LIQUID CRYSTAL DISPLAY DEVICE

(71) Applicant: TCL China Star Optoelectronics Technology Co., Ltd., Guangdong (CN)

(72) Inventor: Kaifeng Zhou, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 647 days.

(21) Appl. No.: 17/048,636

(22) PCT Filed: Aug. 10, 2020

(86) PCT No.: PCT/CN2020/108048
§ 371 (c)(1),
(2) Date: Oct. 19, 2020

(87) PCT Pub. No.: WO2022/007098
PCT Pub. Date: Jan. 13, 2022

(65) Prior Publication Data
US 2023/0113456 A1  Apr. 13, 2023

(30) Foreign Application Priority Data
Jul. 7, 2020  (CN) .......... 202010647701.X

(51) Int. Cl.
*H05B 45/34* (2020.01)
*H05B 45/54* (2020.01)
*F21V 8/00* (2006.01)

(52) U.S. Cl.
CPC .......... *H05B 45/34* (2020.01); *G02B 6/0051* (2013.01); *G02B 6/0053* (2013.01);
(Continued)

(58) Field of Classification Search
CPC ........ H05B 45/34; H05B 45/54; H05B 45/40; G02B 6/0051; G02B 6/0053;
(Continued)

(56) References Cited

U.S. PATENT DOCUMENTS 8,207,933 B2 * 6/2012 Shin ............... G09G 3/3413
315/169.3
8,890,415 B2 * 11/2014 Zhang ............... H05B 45/35
315/297
(Continued)

FOREIGN PATENT DOCUMENTS

CN      101634777      1/2010
CN      201403234      2/2010
(Continued)

OTHER PUBLICATIONS

A backlight module, a liquid crystal display device and its backlight adjusting method, Guo et al. (Year: 2016).*
(Continued)

*Primary Examiner* — Vibol Tan

(57) ABSTRACT

A light-emitting diode (LED) backlight driving circuit is provided. The LED backlight driving circuit includes M LED light-emitting unit groups connected in series and each of the LED light-emitting unit groups includes N LED light-emitting units connected in parallel, where both N and M are an integer greater than 1, wherein each of the LED light-emitting units is connected in series with at least a variable resistor with variable resistance for balancing a voltage difference. The present application further provides a backlight module and a liquid crystal display device manufactured using the LED backlight driving circuit.

19 Claims, 1 Drawing Sheet

(52) U.S. Cl.
CPC ......... *G02B 6/0055* (2013.01); *G02B 6/0073* (2013.01); *H05B 45/54* (2020.01)

(58) Field of Classification Search
CPC .. G02B 6/0055; G02B 6/0073; G02B 6/0083; G09G 3/3413; G02F 1/133603; G02F 1/133606
See application file for complete search history.

(56) References Cited

U.S. PATENT DOCUMENTS

| | | | | |
|---|---|---|---|---|
| 11,197,359 | B1 * | 12/2021 | Lin | ........................ H05B 45/46 |
| 2012/0176565 | A1 * | 7/2012 | Yu | ........................ G09G 3/3406 |
| | | | | 362/217.14 |
| 2013/0342118 | A1 | 12/2013 | Zhang et al. | |

FOREIGN PATENT DOCUMENTS

| | | |
|---|---|---|
| CN | 102121605 | 7/2011 |
| CN | 102322594 | 1/2012 |
| CN | 102708831 | 10/2012 |
| CN | 102737601 | 10/2012 |
| CN | 102821516 | 12/2012 |
| CN | 203036429 | 7/2013 |
| CN | 104681219 | 6/2015 |
| CN | 109362156 | 2/2019 |
| KR | 10-2008-0019835 | 3/2008 |
| KR | 10-2010-0117946 | 11/2010 |

OTHER PUBLICATIONS

A backlight driving circuit and liquid crystal display module and its manufacturing method, Zhang. (Year: 2012).*

* cited by examiner

LED BACKLIGHT DRIVING CIRCUIT, BACKLIGHT MODULE AND LIQUID CRYSTAL DISPLAY DEVICE

RELATED APPLICATIONS

This application is a National Phase of PCT Patent Application No. PCT/CN2020/108048 having International filing date of Aug. 10, 2020, which claims the benefit of priority of Chinese Patent Application No. 202010647701.X filed on Jul. 7, 2020. The contents of the above applications are all incorporated by reference as if fully set forth herein in their entirety.

FIELD AND BACKGROUND OF THE INVENTION

The present application relates to display technologies, and more particularly to a light-emitting diode (LED) backlight driving circuit, a backlight module and a liquid crystal display device.

In recent years, taken as backlight sources used in thin-film transistor liquid crystal display (TFT-LCD) panels, mini light-emitting diodes (Mini-LEDs) can significantly improve display quality in contrast, brightness and etc., and thus has attracted more and more attention from TFT-LCD market.

Mini-LED backlight technology is to bond a LED chip to a backplate with a driving circuit, and realizes dynamic backlight by controlling LED dimming in separate regions using the driving circuit. The more the separate or divided regions for Mini-LED backlight, the greater the number of LED lights and the more sophisticated the backlight control. With this backlight technology, TFT-LCDs can realize a thin appearance and achieve the display quality with high brightness and ultra-high contrast (achieving pure black).

Because of brightness and cost considerations in applying this technology, a plurality of LEDs are currently connected in series in a single region of LEDs for light emission (as shown in FIG. 1). Once the LED is short-circuited or disconnected, there may be situations where some lights are burned due to over current or large-area dim lights occur in a divided region, thereby affecting long-term reliability of products.

Therefore, there is a need to provide a LED backlight driving circuit, a backlight module and a liquid crystal display device for solving the problems in the existing skills.

Because of brightness and cost considerations in applying Mini-LED technology, a plurality of LEDs are connected in series in a single region of LEDs for light emission. Once the LED is short-circuited or disconnected, there may be situations where some lights are burned due to over current or large-area dim lights occur in a divided region, thereby affecting long-term reliability of products.

SUMMARY OF THE INVENTION

In a first aspect, an embodiment of the present application provides a light-emitting diode (LED) backlight driving circuit, including M LED light-emitting unit groups connected in series, each of the LED light-emitting unit groups including N LED light-emitting units connected in parallel, where both N and M are an integer greater than 1, wherein each of the LED light-emitting units is connected in series with at least a variable resistor with variable resistance for balancing a voltage difference.

In the LED backlight driving circuit provided in the embodiment of the present application, the variable resistor is in a low-resistance state at low current and in a high-resistance state at high current.

In the LED backlight driving circuit provided in the embodiment of the present application, the resistance of the variable resistor in the low-resistance state is 0 to 1 ohm and the resistance of the variable resistor in the high-resistance state is 10 to 1000 ohms.

In the LED backlight driving circuit provided in the embodiment of the present application, the variable resistor is composed of specially processed polymer resin and conductive particles.

In the LED backlight driving circuit provided in the embodiment of the present application, a current flowing through each of the LED light-emitting units is within a controllable range in response to the LED backlight driving circuit getting in a short-circuit state or an open-circuit state.

A backlight module is further provided in an embodiment of the present application. The backlight module includes a LED backlight driving circuit including M LED light-emitting unit groups connected in series, each of the LED light-emitting unit groups including N LED light-emitting units connected in parallel, where both N and M are an integer greater than 1, wherein each of the LED light-emitting units is connected in series with at least a variable resistor with variable resistance for balancing a voltage difference.

In the backlight module provided in the embodiment of the present application, the variable resistor is in a low-resistance state at low current and in a high-resistance state at high current.

In the backlight module provided in the embodiment of the present application, the resistance of the variable resistor in the low-resistance state is 0 to 1 ohm and the resistance of the variable resistor in the high-resistance state is 10 to 1000 ohms.

In the backlight module provided in the embodiment of the present application, a current flowing through each of the LED light-emitting units is within a controllable range in response to the LED backlight driving circuit getting in a short-circuit state or an open-circuit state.

In the backlight module provided in the embodiment of the present application, the variable resistor is composed of specially processed polymer resin and conductive particles.

In the backlight module provided in the embodiment of the present application, the backlight module further includes a control module connected to the LED backlight driving circuit.

In the backlight module provided in the embodiment of the present application, the backlight module further includes a prism sheet, a diffuser sheet, a light guide plate and a reflective sheet that are laminated in sequence, wherein the prism sheet and the diffuser sheet are located at a light exit side of the light guide plate.

In a second aspect, an embodiment of the present application further provides a liquid crystal display device, including a backlight module including a light-emitting diode (LED) backlight driving circuit, the LED backlight driving circuit including M LED light-emitting unit groups connected in series, each of the LED light-emitting unit groups including N LED light-emitting units connected in parallel, where both N and M are an integer greater than 1, wherein each of the LED light-emitting units is connected in series with at least a variable resistor with variable resistance for balancing a voltage difference.

In the liquid crystal display device provided in the embodiment of the present application, the variable resistor is in a low-resistance state at low current and in a high-resistance state at high current.

In the liquid crystal display device provided in the embodiment of the present application, the resistance of the variable resistor in the low-resistance state is 0 to 1 ohm and the resistance of the variable resistor in the high-resistance state is 10 to 1000 ohms.

In the liquid crystal display device provided in the embodiment of the present application, a current flowing through each of the LED light-emitting units is within a controllable range in response to the LED backlight driving circuit getting in a short-circuit state or an open-circuit state.

In the liquid crystal display device provided in the embodiment of the present application, the variable resistor is composed of specially processed polymer resin and conductive particles.

In the liquid crystal display device provided in the embodiment of the present application, the backlight module further includes a control module connected to the LED backlight driving circuit.

In the liquid crystal display device provided in the embodiment of the present application, the backlight module further includes a prism sheet, a diffuser sheet, a light guide plate and a reflective sheet that are laminated in sequence, wherein the prism sheet and the diffuser sheet are located at a light exit side of the light guide plate.

In the LED backlight driving circuit, the backlight module and the liquid crystal display device provided in the embodiments of the present application as compared to the existing skills, the plurality of LED light-emitting units are deployed in an arrangement multiple in parallel and multiple in series. Also, each of the LED light-emitting units correspondingly connects in series with at least a variable resistor. Accordingly, it can effectively adjust or moderate the current in the LED light-emitting unit, thereby reducing or eliminating the risk of malfunction of the LED light-emitting units in the existing LED backlight driving circuit.

BRIEF DESCRIPTION OF THE SEVERAL VIEWS OF THE DRAWINGS

FIG. 3B is a schematic diagram illustrating a LED backlight driving circuit, provided in a second embodiment of the present application, in an open-circuit state at a.

FIG. 3C is a schematic diagram illustrating a LED backlight driving circuit, provided in a second embodiment of the present application, in a short-circuit state at a.

DESCRIPTION OF SPECIFIC EMBODIMENTS OF THE INVENTION

Embodiments of the present application can solve the technical problem of long-term reliability of products, affected when some lights burned due to over current or large-area dim lights in a divided region occur in the existing LED backlight driving circuit in a case that a single LED light-emitting unit is short-circuited or disconnected.

A LED backlight driving circuit is provided in an embodiment of the present application. The LED backlight driving circuit includes M LED light-emitting unit groups connected in series and each of the LED light-emitting unit groups includes N LED light-emitting units connected in parallel, where both N and M are an integer greater than 1, wherein each of the LED light-emitting units is connected in series with at least a variable resistor with variable resistance for balancing a voltage difference.

Figure 1:
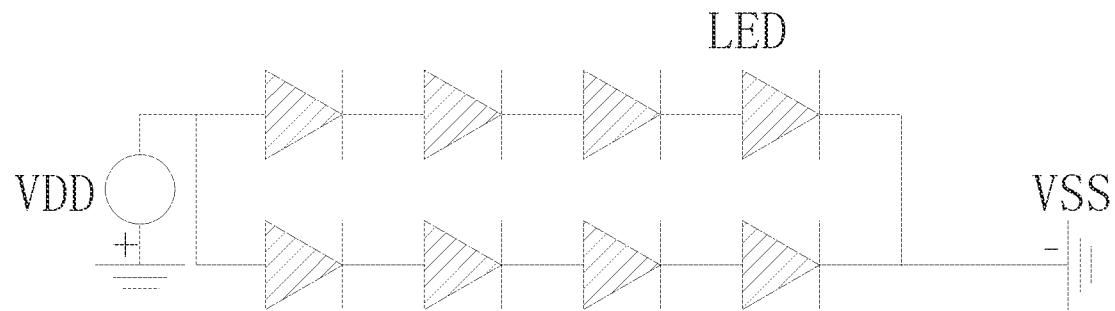
FIG. 1 is a schematic diagram illustrating an existing LED backlight driving circuit.
Figure 2:
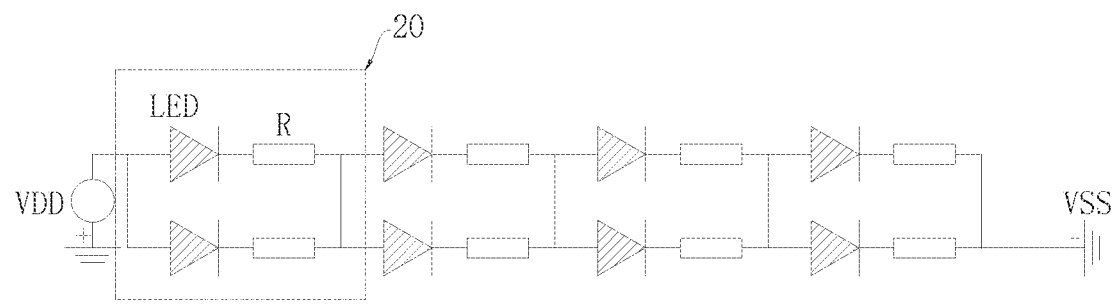
FIG. 2 is a schematic diagram illustrating a LED backlight driving circuit provided in a first embodiment of the present application.

FIG. 2 is a schematic diagram illustrating a LED backlight driving circuit provided in a first embodiment of the present application. It can be seen intuitively from the figure that various components and position relationship between the components are shown.

Specifically, the LED backlight driving circuit includes M LED light-emitting unit groups 20 connected in series and each of the LED light-emitting unit groups 20 includes N LED light-emitting units (LED) connected in parallel, where both N and M are an integer greater than 1 (M=4 and N=2, as shown in FIG. 2). Each of the LED light-emitting units (LED) is connected in series with at least a variable resistor (R) with variable resistance for balancing a voltage difference.

Preferably, LED strips in a single region are deployed in an arrangement—two in parallel and four in series. This prevents the entire LED strip from malfunction, caused by disconnection of a single LED light-emitting unit (LED) when all of them are connected in series.

Preferably, each of the LED light-emitting units is connected in series with a variable resistor (R), in order to prevent a dramatic increase of current of the LED backlight driving circuit, caused by a great change of voltages (divided voltages by resistors) of other LED light-emitting units when a single LED light-emitting unit is short-circuited.

Preferably, the variable resistor (R) is like a conductor when its resistance is small at low current (0 to 20 mA), and is thus in a low-resistance state. The variable resistor (R) is in a high-resistance state when its resistance is large at high current (80 to 200 mA and above that). In this case, it can stabilize the current of other LED light-emitting units in the circuit. Further, the resistance of the variable resistor in the low-resistance state is 0 to 1 ohm and the resistance of the variable resistor in the high-resistance state is 10 to 1000 ohms.

Preferably, the series-connected variable resistors (R) is a special variable resistor, in order to avoid a large increase of power consumption of entire light board in normal operations, caused due to connecting in series with the variable resistor (R). Further, the variable resistor (R) is composed of specially processed polymer resin and conductive particles distributed in the resin. In a case of small current in normal operations, the polymer resin confines the conductive particle at the outside of crystalline structures so as to form a conductor. When a large current passes through the polymer, the polymer is heated and thus expands. Accordingly, the distance between the conductive particles increases and thus the variable resistor (R) gets in the high-resistance state.

Preferably, a current flowing through each of the LED light-emitting units is within a controllable range in response to the LED backlight driving circuit getting in a short-circuit state or an open-circuit state.

Figure 3A:
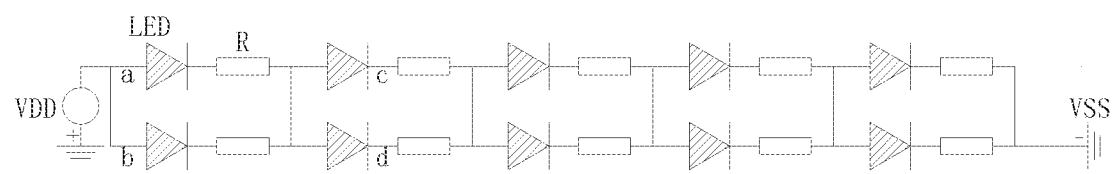
FIG. 3A is a schematic diagram illustrating a LED backlight driving circuit, provided in a second embodiment of the present application, in a normal state.
Figure 3B:
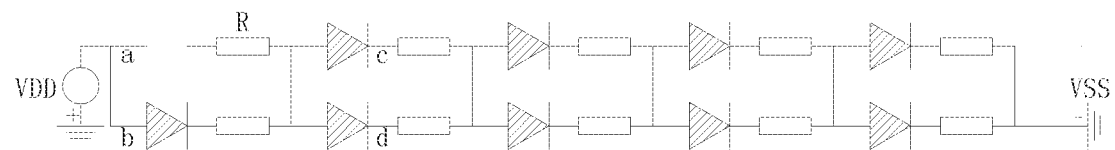
Figure 3C:
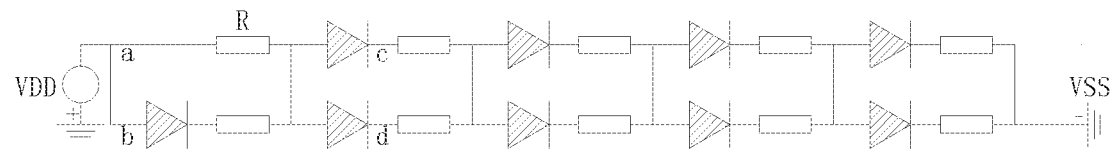

FIGS. 3A, 3B and 3C are schematic diagrams illustrating a LED backlight driving circuit, provided in a second embodiment of the present application, in a normal state, an open-circuit state at a and a short-circuit state at a, respectively. The LED backlight driving circuit includes five LED light-emitting unit groups 20 connected in series and each of the LED light-emitting unit groups 20 includes two LED light-emitting units (LED) connected in parallel.

Each of the LED light-emitting units (LED) is connected in series with at least a variable resistor (R) with variable resistance for balancing a voltage difference.

In a case that the LED backlight driving circuit includes five LED light-emitting unit groups 20 connected in series and each of the LED light-emitting unit groups 20 includes two LED light-emitting units (LED) connected in parallel, and each of the LED light-emitting units (LED) is not connected in series with a variable resistor (R) with variable resistance for balancing a voltage difference, current changes of the LED backlight driving circuit at a, b, c and d are shown in Table 1.

TABLE 1

| Before Improved (without a series-connected resistor) | | a(mA) | b(mA) | c (mA) | d (mA) |
|---|---|---|---|---|---|
| Two in Parallel and Five in Series | Normal state | 100% | 100% | 100% | 100% |
| | Open-circuit state at a | Open circuit | 200% | 83% | 83% |
| | Short-circuit state at a | Short circuit | 0 | 730% | 730% |

When a disconnection occurs at a in the LED backlight driving circuit, the current at b in the LED backlight driving circuit changes to 200% of the current in a normal state and the current at c and d changes to 83% of the current in the normal state. When the LED backlight driving circuit is short-circuited at a, the current at b in the LED backlight driving circuit changes to 0 and the current at c and d changes to 730% of the current in the normal state.

In a case that the LED backlight driving circuit includes five LED light-emitting unit groups 20 connected in series and each of the LED light-emitting unit groups 20 includes two LED light-emitting units (LED) connected in parallel, and each of the LED light-emitting units (LED) is connected in series with a variable resistor (R) with variable resistance for balancing a voltage difference, current changes of the LED backlight driving circuit at a, b, c and d are shown in Table 2.

TABLE 2

| Improved (with a series-connected resistor) - Simulation | | a(mA) | b(mA) | c (mA) | d (mA) |
|---|---|---|---|---|---|
| Two in Parallel and Five in Series | Normal state | 100% | 100% | 100% | 100% |
| | Open-circuit state at a | Open circuit | 200% | 80% | 80% |
| | Short-circuit state at a | Short circuit | 110% | 130% | 130% |

When a disconnection occurs at a in the LED backlight driving circuit, the current at b in the LED backlight driving circuit changes to 200% of the current in a normal state and the current at c and d changes to 80% of the current in the normal state. When the LED backlight driving circuit is short-circuited at a, the current at b in the LED backlight driving circuit changes to 110% and the current at c and d changes to 130% of the current in the normal state.

It can be seen from Tables 1 and 2 that connecting in series with the variable resistor (R) leads to a small influence on an increase of power consumption of entire light board since the resistor is like a conductor and thus has small resistance in normal operations, and in case of a short circuit, the resistance becomes large and this can adjust or moderate the current of the LED backlight driving circuit so as to avoid light burning or malfunction.

A backlight module is further provided in an embodiment of the present application. The backlight module includes a LED backlight driving circuit including M LED light-emitting unit groups connected in series, each of the LED light-emitting unit groups including N LED light-emitting units connected in parallel, where both N and M are an integer greater than 1, wherein each of the LED light-emitting units is connected in series with at least a variable resistor with variable resistance for balancing a voltage difference.

Specifically, the variable resistor is composed of specially processed polymer resin and conductive particles distributed in the resin. In a case of small current in normal operations, the polymer resin confines the conductive particle at the outside of crystalline structures so as to form a conductor. When a large current passes through the polymer, the polymer is heated and thus expands. Accordingly, the distance between the conductive particles increases and thus the variable resistor (R) gets in the high-resistance state.

Preferably, the backlight module further includes a control module connected to the LED backlight driving circuit.

Preferably, the backlight module further includes a prism sheet, a diffuser sheet, a light guide plate and a reflective sheet that are laminated in sequence, wherein the prism sheet and the diffuser sheet are located at a light exit side of the light guide plate.

A liquid crystal display device is further provided in an embodiment of the present application. The liquid crystal display device includes the afore-described backlight module.

Implementation of above operations may refer to above embodiments, and is not repeated herein.

Above all, in the LED backlight driving circuit, the backlight module and the liquid crystal display device provided in the embodiments of the present application, the plurality of LED light-emitting units are deployed in an arrangement—multiple in parallel and multiple in series. Also, each of the LED light-emitting units correspondingly connects in series with at least a variable resistor. Accordingly, it can effectively adjust or moderate the current in the LED light-emitting unit, thereby reducing or eliminating the risk of malfunction of the LED light-emitting units in the existing LED backlight driving circuit.

It should be understood that those of ordinary skill in the art may make equivalent modifications or variations according to the technical schemes and invention concepts of the present application, but all such modifications and variations should be within the appended claims of the present application.

What is claimed is:

1. A light-emitting diode (LED) backlight driving circuit, comprising M LED light-emitting unit groups connected in series, each of the LED light-emitting unit groups comprising N LED light-emitting units connected in parallel, where both N and M are an integer greater than 1,
    wherein each of the LED light-emitting units is connected in series with at least a variable resistor with variable resistance for balancing a voltage difference.

2. The LED backlight driving circuit according to claim 1, wherein the variable resistor is in a low-resistance state at low current and in a high-resistance state at high current.

3. The LED backlight driving circuit according to claim 2, wherein the resistance of the variable resistor in the low-resistance state is 0 to 1 ohm and the resistance of the variable resistor in the high-resistance state is 10 to 1000 ohms.

4. The LED backlight driving circuit according to claim 2, wherein the variable resistor is composed of specially processed polymer resin and conductive particles.

5. The LED backlight driving circuit according to claim 1, wherein a current flowing through each of the LED light-emitting units is within a controllable range in response to the LED backlight driving circuit getting in a short-circuit state or an open-circuit state.

6. A backlight module, comprising a light-emitting diode (LED) backlight driving circuit comprising M LED light-emitting unit groups connected in series, each of the LED light-emitting unit groups comprising N LED light-emitting units connected in parallel, where both N and M are an integer greater than 1, wherein each of the LED light-emitting units is connected in series with at least a variable resistor with variable resistance for balancing a voltage difference.

7. The backlight module according to claim 6, wherein the variable resistor is in a low-resistance state at low current and in a high-resistance state at high current.

8. The backlight module according to claim 7, wherein the resistance of the variable resistor in the low-resistance state is 0 to 1 ohm and the resistance of the variable resistor in the high-resistance state is 10 to 1000 ohms.

9. The backlight module according to claim 6, wherein a current flowing through each of the LED light-emitting units is within a controllable range in response to the LED backlight driving circuit getting in a short-circuit state or an open-circuit state.

10. The backlight module according to claim 6, wherein the variable resistor is composed of specially processed polymer resin and conductive particles.

11. The backlight module according to claim 6, further comprising a control module connected to the LED backlight driving circuit.

12. The backlight module according to claim 6, further comprising a prism sheet, a diffuser sheet, a light guide plate and a reflective sheet that are laminated in sequence, wherein the prism sheet and the diffuser sheet are located at a light exit side of the light guide plate.

13. A liquid crystal display device, comprising a backlight module comprising a light-emitting diode (LED) backlight driving circuit, the LED backlight driving circuit comprising M LED light-emitting unit groups connected in series, each of the LED light-emitting unit groups comprising N LED light-emitting units connected in parallel, where both N and M are an integer greater than 1, wherein each of the LED light-emitting units is connected in series with at least a variable resistor with variable resistance for balancing a voltage difference.

14. The liquid crystal display device according to claim 13, wherein the variable resistor is in a low-resistance state at low current and in a high-resistance state at high current.

15. The liquid crystal display device according to claim 14, wherein the resistance of the variable resistor in the low-resistance state is 0 to 1 ohm and the resistance of the variable resistor in the high-resistance state is 10 to 1000 ohms.

16. The liquid crystal display device according to claim 13, wherein a current flowing through each of the LED light-emitting units is within a controllable range in response to the LED backlight driving circuit getting in a short-circuit state or an open-circuit state.

17. The liquid crystal display device according to claim 13, wherein the variable resistor is composed of specially processed polymer resin and conductive particles.

18. The liquid crystal display device according to claim 13, wherein the backlight module further comprises a control module connected to the LED backlight driving circuit.

19. The liquid crystal display device according to claim 13, wherein the backlight module further comprises a prism sheet, a diffuser sheet, a light guide plate and a reflective sheet that are laminated in sequence, and wherein the prism sheet and the diffuser sheet are located at a light exit side of the light guide plate.

* * * * *